(Model.)

M. F. SEARS.
Mechanical Motors for Churns, &c.

No. 232,552.                    Patented Sept. 21, 1880.

Witnesses:
F. L. Ouraud
E. H. Bradford

Inventor:
Millard F. Sears
By H. J. Ennis
his atty.

UNITED STATES PATENT OFFICE.

MILLARD F. SEARS, OF CARLISLE, MICHIGAN.

MECHANICAL MOTOR FOR CHURNS, &c.

SPECIFICATION forming part of Letters Patent No. 232,552, dated September 21, 1880.

Application filed March 2, 1880. (Model.)

*To all whom it may concern:*

Be it known that I, MILLARD FILLMORE SEARS, a citizen of the United States, residing at Carlisle, in the county of Eaton and State of Michigan, have invented certain new and useful Improvements in Mechanical Motors for Churns, &c.; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain improvements in motive powers for churns, washing-machines, and other similar machines; and it has for its object to provide for readily and conveniently separating the parts of such a motive power, whereby the parts of the machine may be removed for cleansing or other purposes, as more fully hereinafter specified. These objects I attain by the mechanism illustrated in the accompanying drawings, in which—

Figure 1:
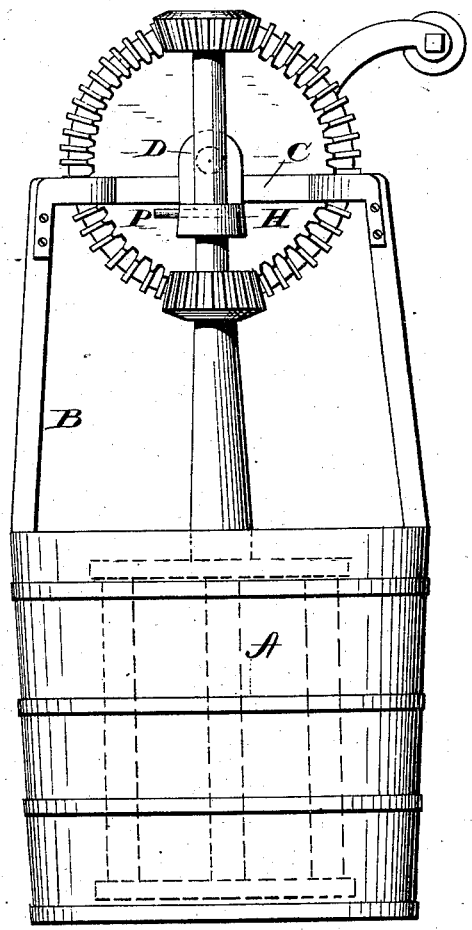
Figure 3:
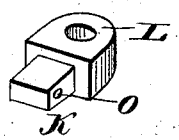
Figure 2:
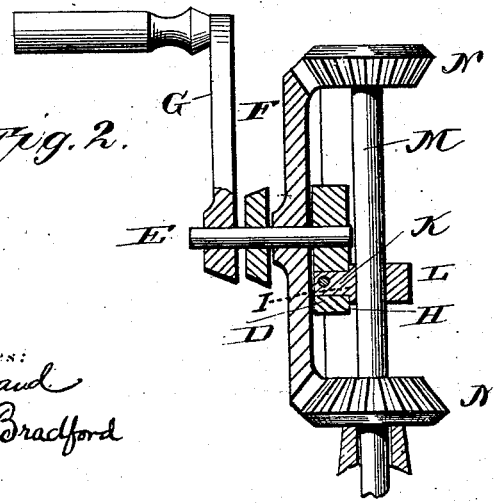

Figure 1 represents an elevation of my improvement as applied to a churn. Fig. 2 represents a view, partly in elevation and partly in section, of the motive power, and Fig. 3 a detached view of a removable or detachable bearing forming part of my apparatus.

In the drawings, A indicates a churn-vessel, from the upper edges of which extend the standards B, to the extremities of which are attached the cross-pieces C, provided with bearings D for a horizontal shaft, E, carrying a beveled-gear wheel, F, and operating-crank G. One of the cross-pieces C is provided with a downward extension, H, having a rectangular slot, I, forming a seat for the shank K of a detachable bearing, L, in which is journaled the upper end of the vertical shaft M of the machine. The said beveled-gear wheel is adapted to intermesh with one or more beveled pinions, N, secured to the working parts of the washing or other machine, which are carried by the shaft M, so that when the bearing L is detached the entire working parts of the machine may be removed without trouble or inconvenience for the purpose of cleansing or for repairs.

The cross-pieces in the present instance are illustrated as bent to one side, in order to bring the bearing L to the center of the apparatus; but it is evident that said pieces may be made straight and the standard set to one side without departing from my invention.

The shank K of the bearing is provided with a transverse opening, O, through which an interlocking-pin, P, may be passed to secure it in place.

Having thus described my invention, what I claim, and desire to secure by Letters Patent, is—

1. In a motive power for machinery, the combination, with the bearings of a horizontal shaft carrying a beveled wheel, of an extension having a rectangular seat and a bearing adapted to fit therein for a vertical shaft carrying the operative mechanism of the machine, substantially as specified.

2. In combination with the standards B of a machine, the cross-pieces C, and journals D, the extension H and bearing L, having a shank, K, adapted to fit in the slot in said bearing, and the locking device for securing the bearing in its seat, substantially as and for the purposes specified.

In testimony whereof I affix my signature in presence of two witnesses.

MILLARD F. SEARS.

Witnesses:
CORLISTER E. SPOFFORD,
HARRIET REID.